United States Patent
Albrecht et al.

(10) Patent No.: US 7,852,717 B2
(45) Date of Patent: Dec. 14, 2010

(54) SYSTEM, METHOD, AND APPARATUS FOR CHARACTERIZING, TRACKING, AND SEGREGATING KNOWN DEFECTIVE DISK REGIONS ON PATTERNED DISKS

(75) Inventors: Thomas Robert Albrecht, San Jose, CA (US); Zvonimir Z. Bandic, San Jose, CA (US); Michael Anthony Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 279 days.

(21) Appl. No.: 11/840,264

(22) Filed: Aug. 17, 2007

(65) Prior Publication Data

US 2009/0046547 A1    Feb. 19, 2009

(51) Int. Cl.
*G11B 7/00* (2006.01)
(52) U.S. Cl. .................................. 369/44.32
(58) Field of Classification Search .......... None
See application file for complete search history.

(56) References Cited

U.S. PATENT DOCUMENTS

| | | | |
|---|---|---|---|
| 4,477,890 A | 10/1984 | Mooney et al. | |
| 5,619,723 A * | 4/1997 | Jones et al. | 710/3 |
| 6,452,735 B1 * | 9/2002 | Egan et al. | 360/31 |
| 6,535,469 B1 | 3/2003 | Heylen | |
| 6,560,176 B1 | 5/2003 | Heylen | |
| 6,850,377 B2 | 2/2005 | Hashi et al. | |
| 6,903,888 B2 * | 6/2005 | Leigh et al. | 360/31 |
| 6,912,189 B2 | 6/2005 | Propps et al. | |
| 6,980,387 B2 | 12/2005 | Yoshizawa et al. | |
| 7,017,044 B1 | 3/2006 | Carpenter et al. | |
| 2002/0018378 A1 * | 2/2002 | Mine | 365/200 |
| 2004/0165496 A1 | 8/2004 | Park et al. | |
| 2004/0174803 A1 * | 9/2004 | Carson | 369/275.4 |
| 2005/0008216 A1 | 1/2005 | Smith et al. | |
| 2006/0222899 A1 * | 10/2006 | Sugimura et al. | 428/826 |
| 2006/0248236 A1 | 11/2006 | Ahmed et al. | |
| 2007/0190196 A1 * | 8/2007 | Bandic et al. | 425/174.4 |

FOREIGN PATENT DOCUMENTS

| | | |
|---|---|---|
| GB | 2263576 A | 7/1993 |
| JP | 5072143 | 3/1993 |
| JP | 06259768 | 9/1994 |
| JP | 11167751 | 6/1999 |

* cited by examiner

*Primary Examiner*—Joseph H Feild
*Assistant Examiner*—Henok G Heyi

(57) ABSTRACT

A system for tracking and segregating repeated defects on media disks as tabled data in disk drives is disclosed. The disks have the same defects as the sub-master from which they are formed. Likewise, the sub-masters have the same defects as the master from which they are formed which, in turn, are passed down to the disks themselves. This information is recorded in the disk drives to avoid read/write operations in the affected sectors of the disks. In addition, the order and production quantities of sub-masters and disks made are tracked since replication performance decays over time.

19 Claims, 4 Drawing Sheets

SYSTEM, METHOD, AND APPARATUS FOR CHARACTERIZING, TRACKING, AND SEGREGATING KNOWN DEFECTIVE DISK REGIONS ON PATTERNED DISKS

BACKGROUND OF THE INVENTION

1. Technical Field

The present invention relates in general to fabricating disks for disk drives and, in particular, to an improved system, method, and apparatus for characterizing, tracking, and segregating known defective regions in patterned magnetic media disks for hard disk drives.

2. Description of the Related Art

Patterned media, discrete track media, or disks with magnetic formatting information created by magnetic lithography or printing processes have inherent, repeatable errors caused by defects in the source pattern. These repeatable errors create unusable disk regions in the same places on every disk produced. These regions would be highly prone to data errors if they were used for data recording. Therefore, it would be advantageous to "map out" these regions on the disks, just as is done on a disk-by-disk basis for conventional media in hard disk drives (HDDs) today.

For conventional media, the process of "mapping out" defects is done on a 100%, disk-by-disk basis, after the drives are constructed. By using heads to read and write data while scanning over the entire surfaces of the disks in the HDD, a manufacturing test system finds the defective areas on each surface of every disk and creates a table that is stored in the drive. During normal operation, the drive avoids the defective areas of the disk for all read/write requirements.

In the prior art, Japanese Publication No. JP11167751 discloses an optical disk system having a table of known defects that is stored on the removable optical media. The table is limited to describing the defects inherited directly from a device used to make the optical disk (i.e., the stamper). This reference also acknowledges the pre-emptive mapping out of sectors that are physically close to other known defects on the optical disk. Although this solution is workable for some applications such as removable optical disks, a comprehensive system for tracking and segregating inherent, multi-generational defects through large scale production of magnetic media would be desirable.

SUMMARY OF THE INVENTION

Embodiments of a system, method, and apparatus for tracking repeated defects on magnetic media disks as data in disk drives are disclosed. The disks have the same defects as the sub-masters from which they are formed. Likewise, the sub-masters have the same defects as the master from which they are formed which, in turn, are passed down to the disks themselves. Thus, it is necessary to know the ancestry of the disks in terms of their master and sub-masters and to record this information in the disk drives to efficiently avoid read/write operations in the affected sectors.

In addition, the order of production of the sub-master and disks made is tracked from each sub-master since replication performance will naturally decay over time. It is therefore useful to track sub-master and disk production volumes in order to have available the most complete data regarding the various types of defects.

In an alternate embodiment, a data structure for holding defect information and the source of each defect on each disk is employed. The initial defects on the master may grow after nanoimprinting to sub-masters, particularly if a defect on the master is located physically close to the edge of the sector in which the defect resides. Thus, each sub-master and disk is provided with a parenting category for each individual defect that indicates the source or origin of each defect.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Since patterned media, discrete track media, and disks with magnetic formatting information created by magnetic lithography and printing have some predictable defective regions in the same places on every disk, it is not necessary to search the disks for these types of defects on a disk-by-disk basis after the drives have been produced. By analyzing a population of disks, repeatable defect regions are identified and a list of known repeating defect regions is prepared and used in every HDD using disks associated with a particular source pattern. Although full disk surface scans may still be needed to find non-repeatable defect regions, time and expense are reduced by first preloading the data regarding known defects into the drives.

Figure 1:
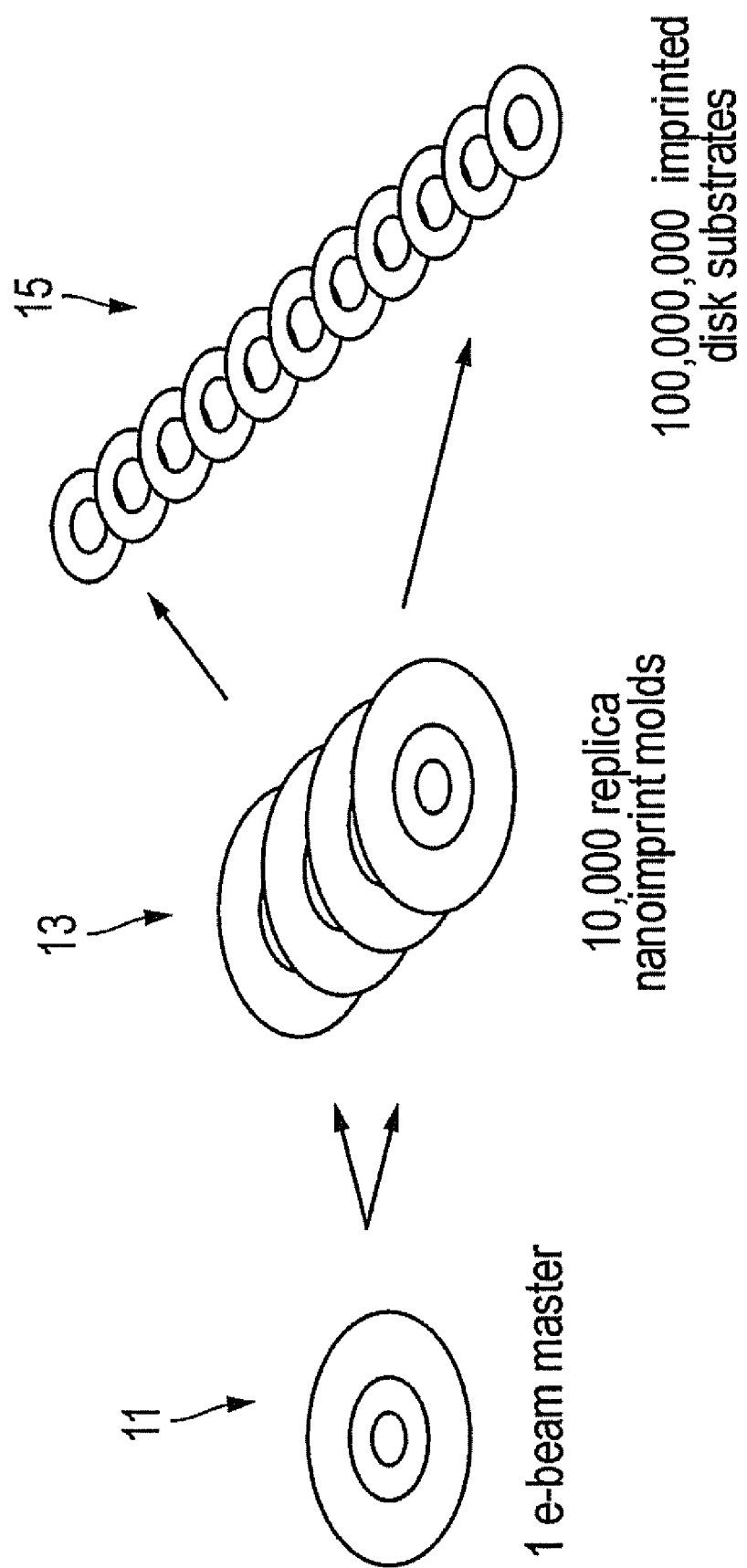
FIG. 1 is a schematic diagram of a multi-generational pattern replication process for producing patterned disks.

Repeatable defects are created at more than one point in the disk patterning process. For example, the drawings depict a simplified, three generation imprinting scenario for ease of illustration. A single master pattern 11 is generated using specialized e-beam equipment. Rather than imprinting disks directly from this very expensive master 11, one or more generations of patterns or "sub-masters" 13 are made. Thereafter, the actual disks 15 used in the HDDs are imprinted using these sub-masters 13. This system offers the advantages of protecting the master pattern 11 and greatly increasing the number of disks 15 to which the pattern can be transferred. Since a typical mold has a limited lifetime (e.g., 10,000 imprints), replication of molds is vital for making millions of disks from a single original master pattern. Although FIG. 1 illustrates a three generation imprinting scenario, four, five or more generations may be used for imprinting, such as two generations of sub-masters 13 between the master 11 and disks 15.

Since no master is perfect, any defects in the master are inherently replicated on every sub-master generation and ultimately on every disk. In addition to these master defects, new defects are typically formed on each generation of sub-masters, which are in turn reproduced on any subsequent sub-master generations and on the finished disks. Thus, the particular table of repeatable defects that applies to a particular disk in a particular drive needs to take into account the specific ancestry of the master and sub-masters used to make it.

These defects on the master and on the sub-masters may be characterized in two classifications: (1) defects present when the master or sub-master is first made, and (2) defects that are generated by wear over time as the master or molds are used to make more sub-masters and disks, respectively, which are permanent and remain with the master or sub-masters for the rest of their lives.

There are various ways to generate the appropriate list of repeatable defects. The source of defect information can be from physical (e.g., direct optical) inspections of the master or sub-masters, or can be detected by inspection of the finished disks. The inspection and testing can take place in either a disk inspection machine, or by magnetic read-write testing in the drive itself.

For example, the data may be generated by looking for defects on a sample of the finished disks, such as by read/write testing in the HDDs. By looking for correlations between various HDDs in the sample, tables of master and sub-master defects are generated, which are then used by subsequent drives to construct the defect data. In one embodiment, performing full-disk scans on about 100 disks produces sufficient baseline information to statistically ascertain all of the initial master defects throughout, e.g., an entire population of HDDs. This list of defects may be subsequently expanded as new correlations are discovered. Similarly, sufficient baseline information for all of the initial sub-master defects are sufficiently known after approximately 100 disks are scanned. Each time disks from a new sub-master are used, it is necessary to look for the new correlations to create the table for the initial defects on that sub-master.

Alternatively, defect information also may be assessed by direct examination of the master and sub-masters. However, analysis of the finished disks by looking for read/write magnetic errors is more readily available in a manufacturing environment.

Figure 2:
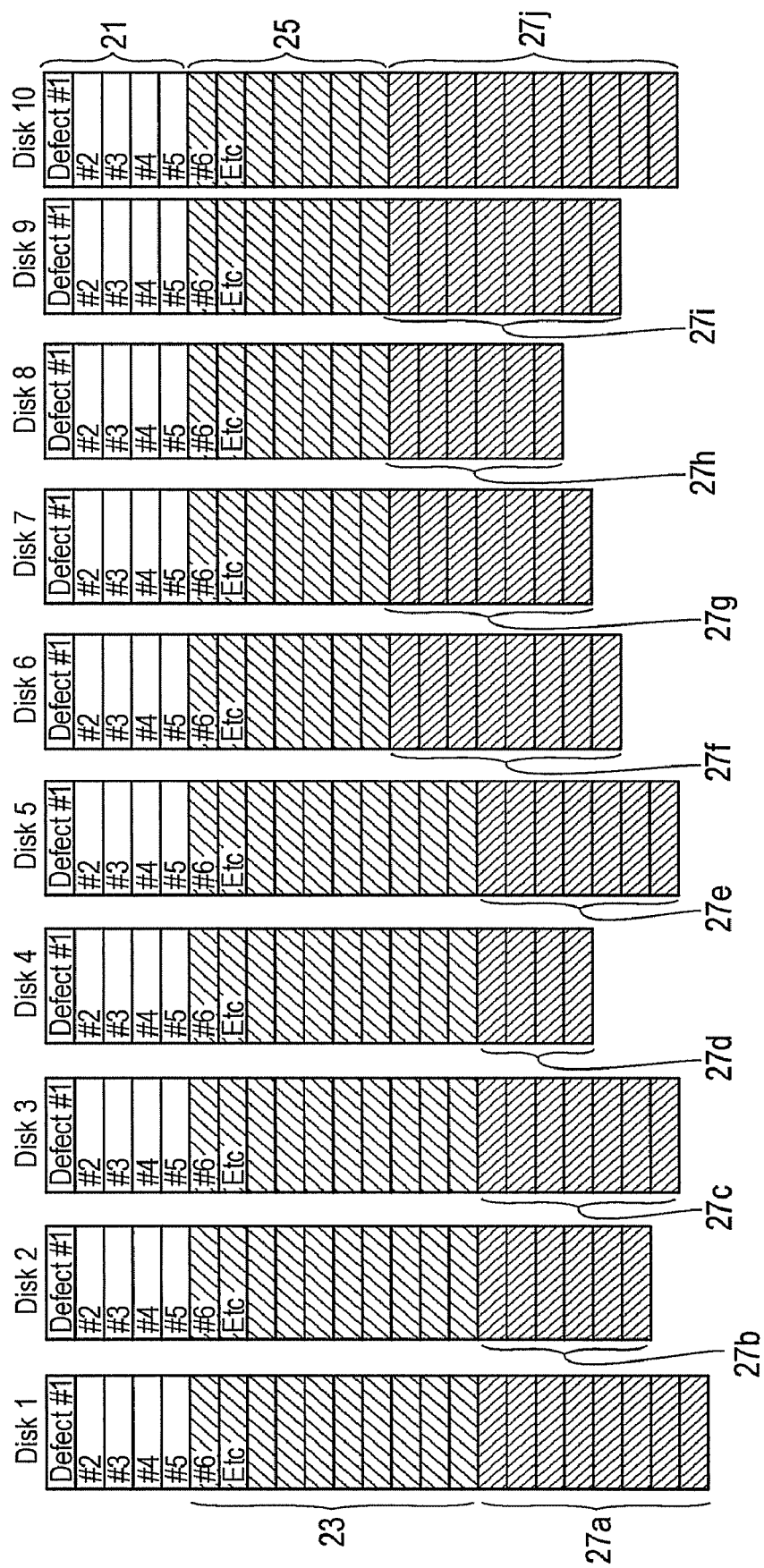
FIG. 2 is a schematic diagram of one embodiment of a system and method of tracking defects through a lineage of disks and is constructed in accordance with the invention.

In one embodiment, a table of defects is generated when a given disk is inspected. For a three generation replication process (e.g., FIG. 1), such a table may be generally characterized as having defects of three types, as shown in FIG. 2. For example, each vertical column represents a single disk made from a sub-master which was made from a master. Two-sided disks would have separate columns for each side. In another embodiment, disks made from two generations of sub-masters would have defects of four types, etc.

By statistical analysis of defects on populations of disks, coupled with knowledge of pattern ancestry, appropriate repeatable defect tables are generated for each disk. As shown in FIG. 2, all disks have the same defects 21 (e.g., the first five (i.e., uppermost) defects) that are present on the master. In this example, all ten disks are made from one master, and the master is used to make two sub-masters. The first five disks (i.e., represented by the vertical columns from left to right) are made using a first sub-master having defects 23, and the second five disks are made from a second sub-master having defects 25. Finally, each of the ten disks has its own unique defects 27a-j, respectively, which are not part of the repeatable defect table, but are found in the drive level final test and added to that drive's defect tables. As described above, these disk-specific defects 27a-j are in addition to the defects 21 imparted by the master, and to the defects 23, 25 imparted by the respective sub-masters. In other embodiments that utilize two or more generations of sub-masters, there will be unique defects in each generation as described herein.

Not only is it necessary to know the ancestry of disks in terms of master and sub-master, it also is useful to keep track of the order of production of each generation of sub-masters and disks made from each sub-master. For example, if a master starts out with N defects, it may be observed that after a certain number of sub-masters are made, N has increased to a larger number. All sub-masters made after that will have the increased number of defects. In contrast, the first sub-masters made from the master will have fewer (i.e., only N) defects. Likewise if a sub-master starts out with Q defects, it will be observed that this number increases over the life of the sub-master (i.e., as thousands of disks are made). It is therefore useful to track sub-master and disk production volumes in order to have the most complete tables of repeatable defects available. As another benefit of this system, the number of defects in the table also may be used as a criterion to determine the amount of wear on a sub-master, and to decide when a sub-master needs to be taken out of production (e.g., because of excessive wear).

Alternatively, it is favorable to create a different data structure to hold "source of defect" (e.g., "tree") information for the various defects on each disk. It is expected that the initial defects on the master will grow after nanoimprinting to sub-masters. For example, a defect on the master may be located physically close to the edge of the sector in which the defect resides. Therefore, some of the defects on a sub-master are related to the defects originating from the master. The application of this principle to the unique defects of each disk and its one or more generations of sub-masters is analogous, and a significant portion of the defect "tree" for each disk may become an "ordered tree."

Figure 3:
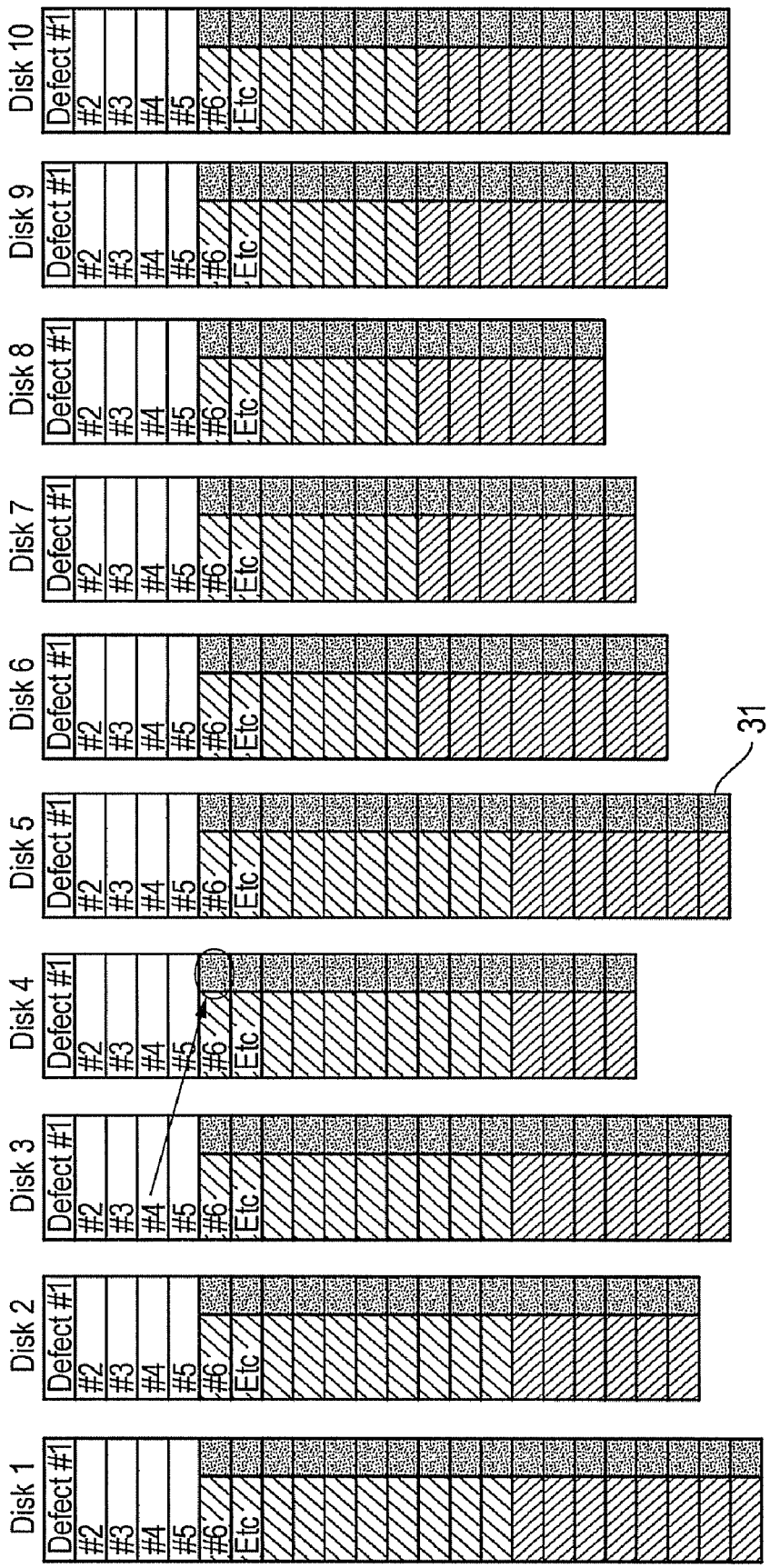
FIG. 3 is a schematic diagram of another embodiment of a system and method of tracking defects through a lineage of disks and is constructed in accordance with the invention.

Thus, in another embodiment and as shown in FIG. 3, a "parenting" category 31 may be introduced for each individual defect (e.g., from the master, sub-master, or disk) that indicates the "parent" of each defect. For example, an arrow is extends from Defect #4 on Disk 3, to Defect #6 on Disk 4 to indicate this relationship between some defects. However, as described herein, some of the defects on a sub-master or disk are not caused by a parent. For all other defects, every defect will have one parent, for which data sector location(s) is/are recorded in a reserved location 31 as shown. For all such defects, each "parent" may have many "children," while each child has only one parent. Based on this information an "ordered tree" may be formed for a subset of defects.

The advantage of keeping defect data for each disk in this form is that many algorithms exist for searching trees, especially "ordered trees," which may additionally reduce the expense of searching for defects. In addition, part of the "growth" of defects during the master-to-sub-master-to-disk process may be monitored in this way.

In the case where defect tables are generated using the final test data for disk drives, patterns of repeatable defects must be detected to understand the lineage of the defect and the growing list of repeatable defects associated with each generational pattern. In one embodiment, such defect tables or data may be stored in flash memory located on the electronics card, which is generally attached to the bottom side of the disk drive.

The invention also comprises a method of tracking and segregating defects on magnetic media disk for hard disk drive production. In one embodiment, the method comprises forming a master and analyzing the master for master defects that are unique to the master; nanoimprint molding a plurality of sub-masters (e.g., one or more generations) from the master and any subsequent generations of sub-masters, and analyzing each generation of the sub-masters for sub-master defects that are unique to respective ones of the sub-masters, each sub-master also having the master defects; fabricating a plurality of magnetic media disks from each of the sub-masters (e.g., last generations of sub-masters) and building hard disk drives with the magnetic media disks, each of the magnetic media disks having the master defects and the sub-master defects; preloading data regarding the master defects and respective ones of the sub-master defects into the hard disk drives; and analyzing sectors of the magnetic media disks other than those containing the master defects and the sub-master defects to locate unique, non-repeatable defects on respective ones of the magnetic media disks. The final step may comprise individual disk inspections or magnetic read-write testing of the magnetic media disks in respective ones of the hard disk drives.

Alternatively, the method may comprise reanalyzing the master for additional master defects in excess of said master defects, reanalyzing the sub-masters for additional sub-master defects in excess of said sub-master defects, preloading data regarding the master defects, additional master defects, and respective ones of the sub-master defects and additional sub-master defects into the hard disk drives, and analyzing sectors of the magnetic media disks other than those containing the master defects, additional master defects, sub-master defects, and additional sub-master defects to locate unique, non-repeatable defects on the magnetic media disks.

The method may further comprise searching the data and monitoring and comparing the master-to-sub-master-to-disk forming process for growth in the master defects, sub-master defects, and non-repeatable defects; or determining an amount of wear on the master and the sub-masters based on the master and sub-masters defects, respectively, and deciding when the master and the sub-masters are taken out of production based on the amount of wear; or determining whether any of the master defects, sub-master defects, and non-repeatable defects are located in relative proximity to each other, and proactively designating sectors on the magnetic media disks having proximate ones of the master defects, sub-master defects, and non-repeatable defects as unusable, non-read/write sectors; or designating in the hard disk drives a source of the master defects, sub-master defects, and non-repeatable defects as being from the master, the sub-master, and the magnetic media disk, respectively.

Figure 4:
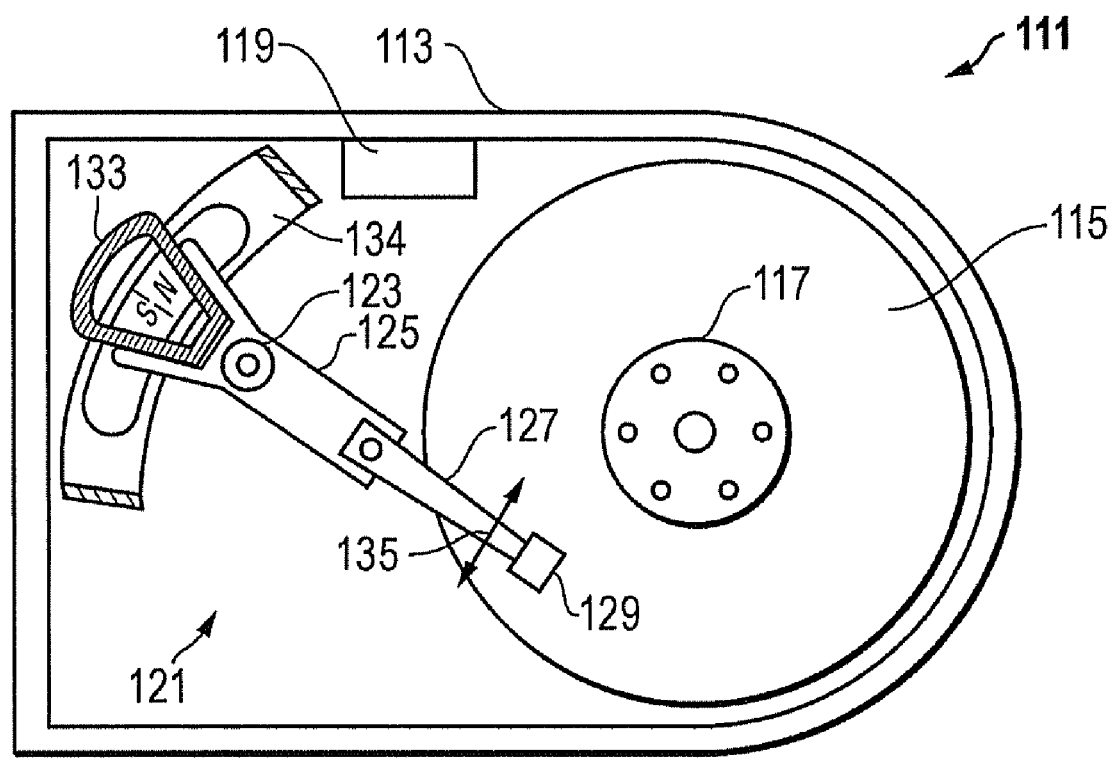
FIG. 4 is a schematic diagram of one embodiment of a disk drive constructed in accordance with the invention.

Referring now to FIG. 4, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

While the invention has been shown or described in only some of its forms, it should be apparent to those skilled in the art that it is not so limited, but is susceptible to various changes without departing from the scope of the invention.

What is claimed is:

1. A method of tracking and segregating defects on magnetic media disks for hard disk drive production, comprising:
   (a) forming a master having master defects that are unique to the master;
   (b) forming a plurality of sub-masters from the master, each of the sub-masters having sub-master defects that are unique to respective ones of the sub-masters, and each sub-master also having the master defects;
   (c) fabricating a plurality of magnetic media disks from each of the sub-masters and building hard disk drives with the magnetic media disks, each of the magnetic media disks having the master defects and respective sub-master defects;
   (d) analyzing the magnetic media disks in a sample of the hard disk drives, and identifying the master defects, respective sub-master defects, and unique, non-repeatable defects on respective ones of the magnetic media disks to compile defect data; and
   (e) loading portions of the defect data into all of the hard disk drives regarding the master and respective sub-masters from which respective ones of the magnetic media disks are formed without testing every one of the hard disk drives, to prevent read/write operations in sectors of the magnetic media disks affected by said portions of the defect data.

2. A method according to claim 1, wherein step (d) comprises one of optically inspecting the magnetic media disks and magnetic read/write testing of the magnetic media disks.

3. A method according to claim 1, wherein step (d) comprises analysis of a subsequent sample of the hard disk drives for additional master defects in excess of said master defects, and for additional sub-master defects in excess of said sub-master defects, step (e) comprises loading defect data into subsequent ones of the hard disk drives regarding the master defects, additional master defects, respective ones of the sub-master defects and additional sub-master defects, and unique, non-repeatable defects in the subsequent sample of the hard disk drives.

4. A method according to claim 1, further comprising reviewing the defect data of step (d) and monitoring and comparing the master-to-sub-master-to-disk forming process for growth in the master defects and sub-master defects.

5. A method according to claim 1, further comprising determining an amount of wear on the master and the sub-masters based on the master and sub-masters defects, respectively, and deciding when the master and the sub-masters are taken out of production based on the amount of wear.

6. A method according to claim 1, further comprising determining whether any of the master defects, sub-master defects, and non-repeatable defects are located in relative proximity to each other on the magnetic media disks, and proactively designating sectors on the magnetic media disks having proximate ones of the master defects, sub-master defects, and non-repeatable defects as unusable, non-read/write sectors.

7. A method according to claim 1, further comprising designating in the hard disk drives a source of the master defects, sub-master defects, and non-repeatable defects as being from the master, the sub-master, and the magnetic media disk, respectively.

8. A method according to claim 1, wherein step (b) comprises forming a first generation of sub-masters from the master, each of the first generation of sub-masters having first generation sub-master defects that are unique to respective ones of the first generation of sub-masters;
   forming at least one subsequent generation of sub-masters from the first generation of sub-masters, each of the at least one subsequent generation of sub-masters having subsequent generation sub-master defects that are unique to respective ones of the at least one subsequent generation of sub-masters, and each of the first generation and the at least one subsequent generation of sub-masters also having the master defects; and step (c) comprises:
   fabricating magnetic media disks from each of a final generation of sub-masters of the at least one subsequent generation of sub-masters and building hard disk drives with the magnetic media disks, each of the magnetic media disks having the master defects and respective first and subsequent generation sub-master defects.

9. A method of tracking and segregating defects on a magnetic media disk, comprising:
   (a) forming a master and analyzing the master for master defects that are unique to the master;
   (b) forming a sub-master from the master and analyzing the sub-master for sub-master defects that are unique to the sub-master, the sub-master also having the master defects;
   (c) forming magnetic media disks from the sub-master, the magnetic media disks having the master defects and the sub-master defects;
   (d) analyzing the magnetic media disks for defects other than the master defects and the sub-master defects to locate non-repeatable defects on the magnetic media disks; and
   (e) loading the master and sub-master defects from steps (c) and (d) into all of the magnetic media disks without testing every one of the magnetic media disks for the master and sub-master defects.

10. A method according to claim 9, wherein step (d) comprises one of optically inspecting the magnetic media disks and magnetic read-write testing of the magnetic media disks.

11. A method according to claim 9, wherein step (a) comprises forming a single master using e-beam equipment, step (b) comprises nanoimprint molding approximately 10,000 sub-masters from the single master, and step (c) comprises fabricating approximately 100,000,000 disks from the sub-masters.

12. A method according to claim 9, wherein step (b) comprises forming a plurality of sub-masters from the master, and reanalyzing the master for additional master defects in excess of said master defects, step (c) comprises forming a plurality of magnetic media disks from the sub-masters, analyzing subsequent ones of the sub-masters for additional sub-master defects in excess of said sub-master defects, and step (d) comprises analyzing areas of the magnetic media disks other than those containing the master defects, additional master defects, sub-master defects, and additional sub-master defects to locate non-repeatable defects on the magnetic media disks.

13. A method according to claim 9, further comprising generating defect data concerning the master defects, sub-master defects, and non-repeatable defects, and storing defect data on hard disk drives constructed with the magnetic media disks to prevent read/write operations in sectors of the magnetic media disks affected by the defect data.

14. A method according to claim 13, further comprising searching for defect data, and monitoring and comparing the master-to-sub-master-to-disk forming process for growth in the master defects, sub-master defects, and non-repeatable defects over time.

15. A method according to claim 13, further comprising loading data regarding the master defects and the sub-master defects into the hard disk drives before step (d).

16. A method according to claim 9, further comprising determining an amount of wear on the master and the sub-master based on the master and sub-master defects, respectively, and deciding when the master and the sub-master are taken out of production based on the amount of wear.

17. A method according to claim 9, further comprising determining whether any of the master defects, sub-master defects, and non-repeatable defects are located in relative proximity to each other on the magnetic media disk, and proactively designating sectors on the magnetic media disks having proximate ones of the master defects, sub-master defects, and non-repeatable defects as unusable, non-read/write sectors.

18. A method according to claim 9, further comprising designating a source of the master defects, sub-master defects, and non-repeatable defects as being from the master, the sub-master, and the magnetic media disks, respectively.

19. A method according to claim 9, wherein step (b) comprises forming a first generation sub-master from the master and analyzing the first generation sub-master for first generation sub-master defects that are unique to the first generation sub-master;
   forming a second generation sub-master from the first generation sub-master and analyzing the second generation sub-master for second generation sub-master defects that are unique to the second generation sub-master, the first and second generation sub-masters also having the master defects; and step (c) comprises:
   forming magnetic media disks from the second generation sub-master, the magnetic media disks having the master defects and respective ones of the first and second generation sub-master defects; and step (d) comprises:
   analyzing the magnetic media disks for defects other than the master defects and the first and second generation sub-master defects to locate non-repeatable defects on the magnetic media disks.

* * * * *